United States Patent
Kim et al.

(10) Patent No.: US 9,900,788 B2
(45) Date of Patent: Feb. 20, 2018

(54) METHOD FOR DETERMINING BIT LENGTH OF RANK INDEX IN WIRELESS COMMUNICATIONS SYSTEM AND APPARATUS THEREFOR

(71) Applicant: LG ELECTRONICS INC., Seoul (KR)

(72) Inventors: Hyungtae Kim, Seoul (KR); Byounghoon Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 14/769,516

(22) PCT Filed: Feb. 21, 2014

(86) PCT No.: PCT/KR2014/001422
§ 371 (c)(1),
(2) Date: Aug. 21, 2015

(87) PCT Pub. No.: WO2014/129842
PCT Pub. Date: Aug. 28, 2014

(65) Prior Publication Data
US 2016/0007212 A1    Jan. 7, 2016

(51) Int. Cl.
*H04W 84/18* (2009.01)
*H04W 16/32* (2009.01)
(Continued)

(52) U.S. Cl.
CPC .......... *H04W 16/32* (2013.01); *H04B 7/0452* (2013.01); *H04B 7/0486* (2013.01);
(Continued)

(58) Field of Classification Search
CPC ........ H04W 84/18; H04L 41/12; H04L 45/02; H04L 45/00; H04L 45/04; H04L 41/04
See application file for complete search history.

(56) References Cited

U.S. PATENT DOCUMENTS

| 2011/0032839 A1* | 2/2011 | Chen .................. H04B 7/024 370/252 |
| 2012/0051245 A1 | 3/2012 | Nam et al. |

(Continued)

FOREIGN PATENT DOCUMENTS

| KR | 10-2012-0083870 A | 7/2012 |
| WO | 2011-082832 A1 | 7/2011 |

(Continued)

OTHER PUBLICATIONS

"Technical Specification Group Radio Access Network: Evolved Universal Terrestrial Radio Access (E-UTRA); Multiplexing and channel coding (Release 10)", 3GPP TS 36.212 V10.7.0, Dec. 2012.

(Continued)

*Primary Examiner* — Hassan Phillips
*Assistant Examiner* — Prenell Jones
(74) *Attorney, Agent, or Firm* — Dentons US LLP

(57) ABSTRACT

The present invention relates to a wireless communications system. A method for enabling a terminal to determine the bit length of a rank index (RI) according to an embodiment of the present invention includes the steps of: receiving the information of the number of a first reference signal (RS) antenna ports of a first cell and of the number of a second RS antenna ports of a second cell; receiving the information of the number of first layers and second layers; mapping the number of the first layers to one of the first and the second cell and the number of the second layers to the other cell; and determining the bit length of a first RI based on the minimum value among the number of the first layers and the number of the RS antenna ports associated with the number of the first layers, and the bit length of a second RI based on the minimum value among the number of the second layers and the number of the RS antenna ports associated with the number of the second layers.

15 Claims, 12 Drawing Sheets

(51) Int. Cl.
*H04B 7/0452* (2017.01)
*H04B 7/04* (2017.01)
*H04B 7/06* (2006.01)
*H04W 72/06* (2009.01)

(52) U.S. Cl.
CPC ............ *H04B 7/063* (2013.01); *H04B 7/0626* (2013.01); *H04W 72/06* (2013.01)

(56) References Cited

U.S. PATENT DOCUMENTS

| | | | | |
|---|---|---|---|---|
| 2012/0207115 A1* | 8/2012 | Oh | ...................... | H04L 5/0092 370/329 |
| 2012/0213261 A1* | 8/2012 | Sayana | ................ | H04L 5/0094 375/224 |
| 2012/0230290 A1* | 9/2012 | Seo | ...................... | H04L 1/0026 370/329 |
| 2013/0016604 A1* | 1/2013 | Ko | ...................... | H04B 7/0404 370/216 |
| 2013/0034179 A1* | 2/2013 | Zhang | ................ | H04B 7/0469 375/267 |
| 2013/0039203 A1 | 2/2013 | Fong et al. | | |
| 2013/0195008 A1* | 8/2013 | Pelletier | ............... | H04B 7/0417 370/328 |
| 2013/0223258 A1* | 8/2013 | Seo | ...................... | H04W 24/02 370/252 |
| 2013/0235962 A1* | 9/2013 | O'Keefe et al. | ........ | H01Q 3/267 375/371 |
| 2014/0204878 A1* | 7/2014 | Jang | ...................... | H04L 1/0042 370/329 |
| 2015/0071238 A1* | 3/2015 | Seo | ...................... | H04L 1/0026 370/329 |
| 2015/0222341 A1* | 8/2015 | Ko | ...................... | H04B 7/0486 375/267 |
| 2015/0249490 A1* | 9/2015 | Chen | ................... | H04B 7/0689 375/295 |
| 2016/0006539 A1* | 1/2016 | Nammi | ................ | H04L 1/0003 370/329 |
| 2016/0143019 A1* | 5/2016 | Hammarwall | .......... | H04L 1/003 370/329 |

FOREIGN PATENT DOCUMENTS

| | | |
|---|---|---|
| WO | 2011-136559 A2 | 11/2011 |
| WO | 2012-036492 A2 | 3/2012 |
| WO | 2012102479 A2 | 8/2012 |

OTHER PUBLICATIONS

Huawei et al., "Issues on R1 bit width", R2-130296, 3GPP TSG-RAN WG2 Meeting #81, St. Julian's, Malta, Jan. 28-Feb. 1, 2013, (http://www.3gpp.org/ftp/tsg_ran/wg2_rt2/TSGR2_81/Docs/), see pp. 2, 3.

* cited by examiner

FIG. 2
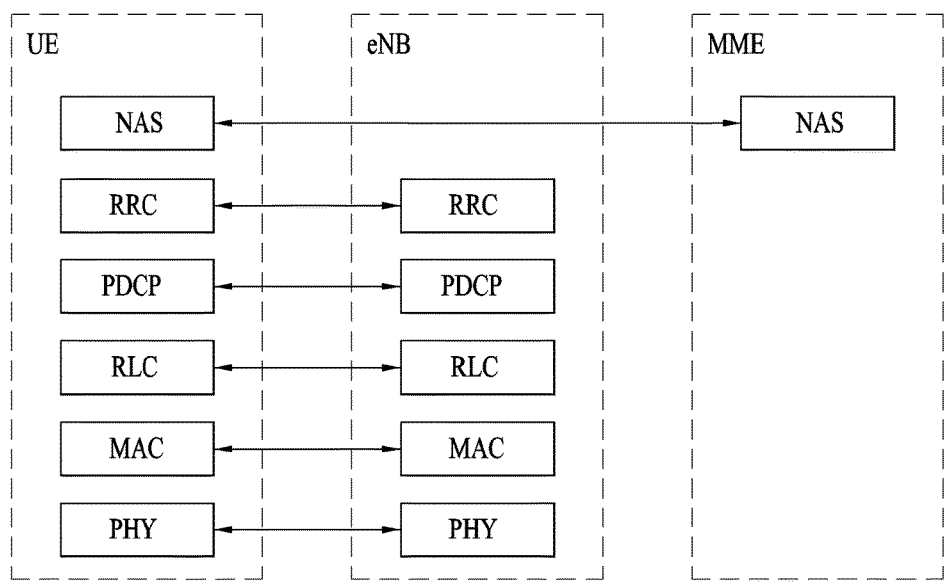
(a) Control - Plane Protocol Stack
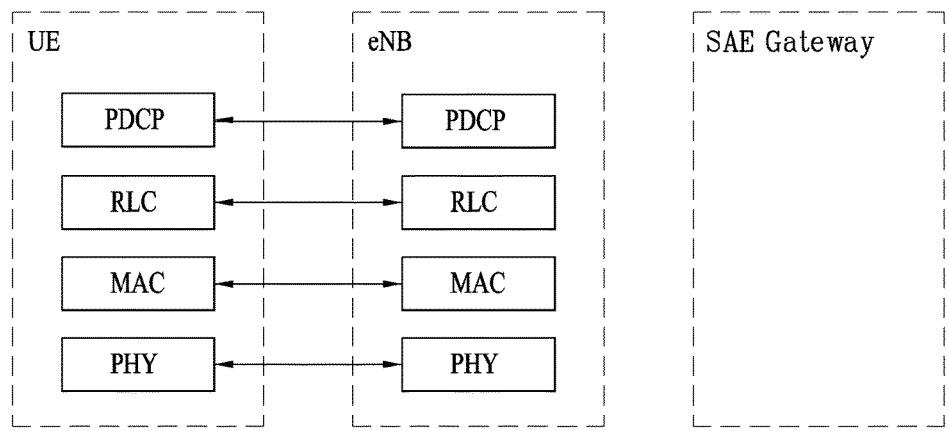
(b) User - Plane Protocol Stack

| CQI Reporting Mode | | PMI Feedback Type | |
|---|---|---|---|
| | | No PMI | Single PMI |
| PUCCH CQI Feedback Type | Wideband (Wideband CQI) | Mode 1-0 | Mode 1-1 |
| | UE-Selected (Subband CQI) | Mode 2-0 | Mode 2-1 |

FIG. 14
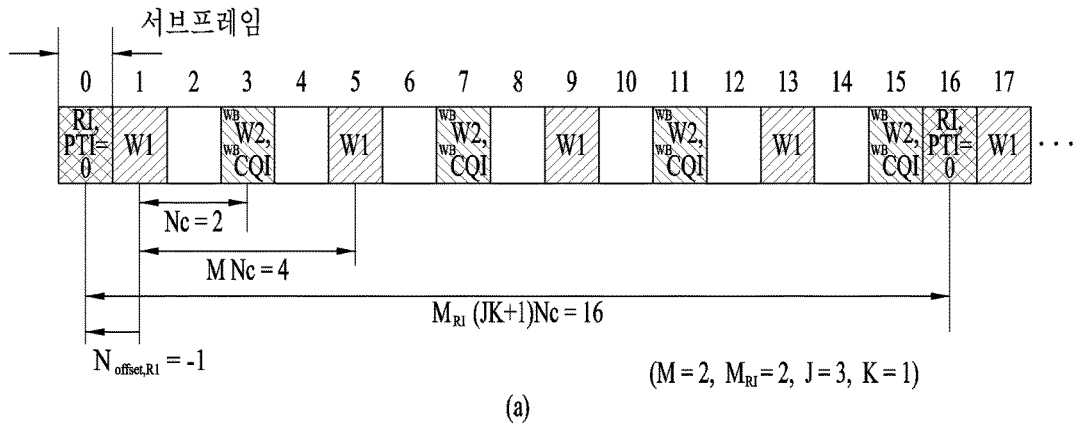
(a)
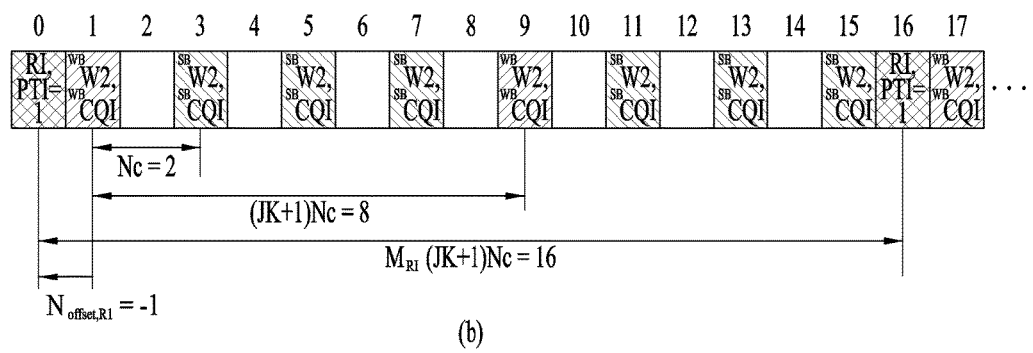
(b)
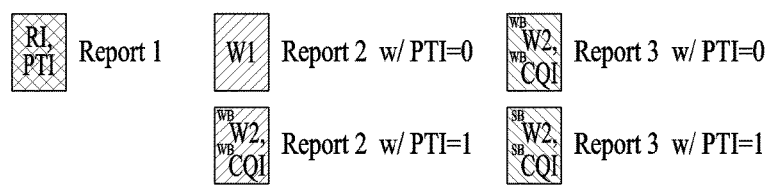
FIG. 15
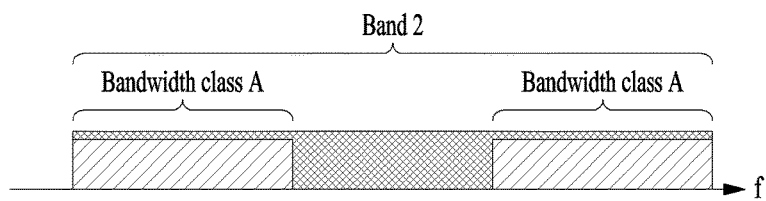

1

METHOD FOR DETERMINING BIT LENGTH OF RANK INDEX IN WIRELESS COMMUNICATIONS SYSTEM AND APPARATUS THEREFOR

This application is a 35 U.S.C. § 371 National Stage Entry of International Application No. PCT/KR2014/001422 filed Feb. 21, 2014, which claims benefit of and priority to U.S. Provisional Application Nos. 61/768,528 filed Feb. 24, 2013 and 61/811,127 filed Apr. 12, 2013, all of which are incorporated by reference for all purposes as if fully set forth herein.

TECHNICAL FIELD

The present invention relates to a wireless communication system, and more particularly, to a method of determining a bit length of a rank index in a wireless communication system supporting MIMO (multiple-input multiple-output) and an apparatus therefor.

BACKGROUND ART

A 3rd generation partnership project long term evolution (3GPP LTE) communication system will be described below as an exemplary mobile communication system to which the present invention is applicable.

FIG. 1 is a diagram schematically showing a network structure of an evolved universal mobile telecommunications system (E-UMTS) as an exemplary radio communication system. The E-UMTS system has evolved from the conventional UMTS system and basic standardization thereof is currently underway in the 3GPP. The E-UMTS may be generally referred to as a long term evolution (LTE) system. For details of the technical specifications of the UMTS and E-UMTS, refer to Release 7 and Release 8 of "3rd generation partnership project; technical specification group radio access network".

Referring to FIG. 1, the E-UMTS includes a user equipment (UE), eNBs (or eNode Bs or base stations), and an access gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and hybrid automatic repeat and request (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A core network (CN) may include the AG, a network node for user registration of the UE, and the like. The AG manages mobility of a UE on a tracking area (TA) basis, wherein one TA includes a plurality of cells.

Although radio communication technology has been developed up to LTE based on wideband code division multiple access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

A MIMO (multiple-input multiple-output) technology refers to a technology capable of enhancing transmission and reception data efficiency in a manner of selecting multiple transmission antennas and multiple reception antennas instead of using a single transmission antenna and a single reception antenna. In particular, the MIMO technology corresponds to a technology for increasing capability or improving performance in a manner that a transmitting end or a receiving end of a wireless communication system uses multiple antennas. The MIMO technology can also be called a multi-antenna technology.

In order to support multi-antenna transmission, it may be able to apply a precoding matrix to appropriately distribute transmission information to each antenna according to a channel status and the like.

DISCLOSURE

Technical Problem

A technical task of the present invention is to provide a method of determining a bit length of a rank index in a wireless communication based on the discussion mentioned above.

It is to be understood that both the foregoing general description and the following detailed description of the present invention are exemplary and explanatory and are intended to provide further explanation of the invention as claimed.

Technical Solution

To achieve these and other advantages and in accordance with the purpose of the present invention, as embodied and broadly described, according to one embodiment, a method of determining a bit length (bit width) of a rank index (RI), which is determined by a user equipment in a wireless communication system, includes the steps of receiving information on the number of first reference signal (RS) antenna ports of a first cell and the number of second RS antenna ports of a second cell, receiving information on the number of first layers and the number of second layers, mapping the number of the first layers to one of the first cell and the second cell and mapping the number of the second layers to another cell, and determining a bit length of a first RI based on a minimum value among the number of the first layers and the number of RS antenna ports associated with the number of the first layers and determining a bit length of a second RI based on a minimum value among the number of the second layers and the number of RS antenna ports associated with the number of the second layers.

To further achieve these and other advantages and in accordance with the purpose of the present invention, according to a different embodiment, a user equipment determining a bit length (bit width) of a rank index (RI) in a wireless communication system includes an RF (radio frequency) unit and a processor, the processor configured to receive information on the number of first reference signal (RS) antenna ports of a first cell and the number of second RS antenna ports of a second cell, the processor configured to receive information on the number of first layers and the number of second layers, the processor configured to map the number of the first layers to one of the first cell and the second cell and map the number of the second layers to another cell, the processor configured to determine a bit length of a first RI based on a minimum value among the number of the first layers and the number of RS antenna ports associated with the number of the first layers and determine a bit length of a second RI based on a minimum value among the number of the second layers and the number of RS antenna ports associated with the number of the second layers.

Following items can be commonly applied to the aforementioned embodiments of the present invention.

The mapping step can include the step of mapping a lower value among the number of the first layers and the number of the second layers to a cell of a lower center frequency among the first cell and the second cell.

The mapping step can include the step of mapping a higher value among the number of the first layers and the number of the second layers to a cell of a lower center frequency among the first cell and the second cell.

The mapping step can include the step of mapping a lower value among the number of the first layers and the number of the second layers to a cell of a lower cell index among the first cell and the second cell.

The mapping step can include the step of mapping a higher value among the number of the first layers and the number of the second layers to a cell of a lower cell index among the first cell and the second cell.

The mapping step can include the step of mapping a lower value among the number of the first layers and the number of the second layers to a cell of a lower bandwidth among the first cell and the second cell.

The mapping step can include the step of mapping a higher value among the number of the first layers and the number of the second layers to a cell of a lower bandwidth among the first cell and the second cell.

The mapping step can include the step of mapping a lower value among the number of the first layers and the number of the second layers to a cell of which the number of assigned CSI (channel state information) processes is lower among the first cell and the second cell.

The mapping step can include the step of mapping a higher value among the number of the first layers and the number of the second layers to a cell of which the number of assigned CSI (channel state information) processes is lower among the first cell and the second cell.

The method can further include the step of receiving information on the number of layers respectively mapped to the first cell and the second cell via RRC (radio resource control) signaling.

It is to be understood that both the foregoing general description and the following detailed description are exemplary and explanatory and are intended to provide further explanation of the invention as claimed.

Advantageous Effects

According to an embodiment of the present invention, it is able to provide a method of determining a bit length of a rank index in a wireless communication system and an apparatus therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating a control plane and a user plane of a radio interface protocol between a UE and an evolved universal terrestrial radio access network (E-UTRAN) based on a 3rd generation partnership project (3GPP) radio access network standard;

FIG. 14 is a diagram illustrating periodic reporting of CSI when a hierarchical codebook is used;

FIG. 15 is a diagram for a band combination (2A, 2A) of non-contiguous intra-bands on band 2;

BEST MODE

Figure 1:
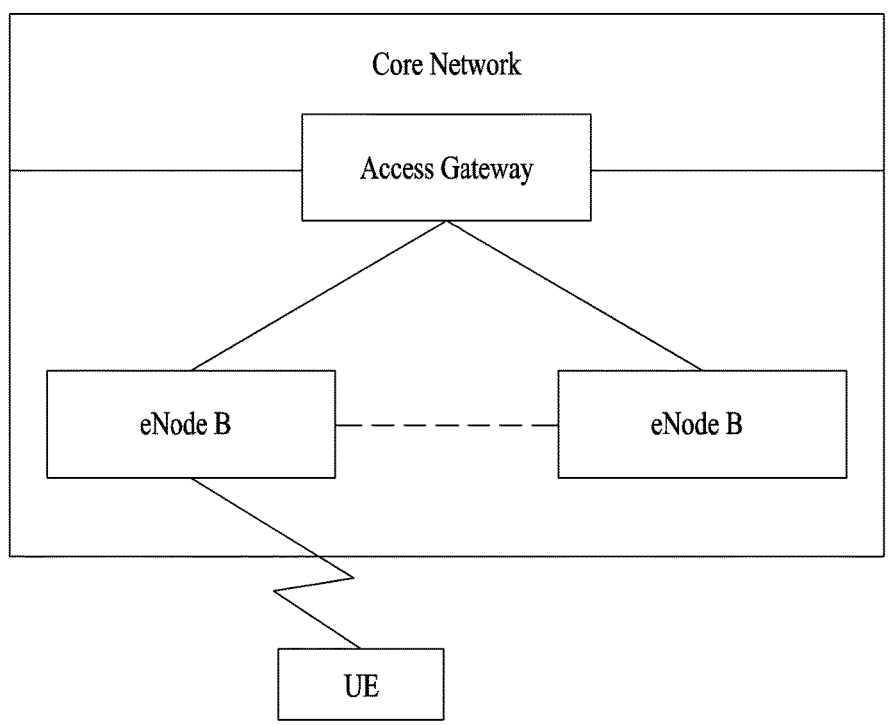
FIG. 1 is a diagram schematically showing a network structure of an evolved universal mobile telecommunications system (E-UMTS) as an exemplary radio communication system.

The configuration, operation and other features of the present invention will be understood by the embodiments of the present invention described with reference to the accompanying drawings. The following embodiments are examples of applying the technical features of the present invention to a 3rd generation partnership project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 is a diagram illustrating a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
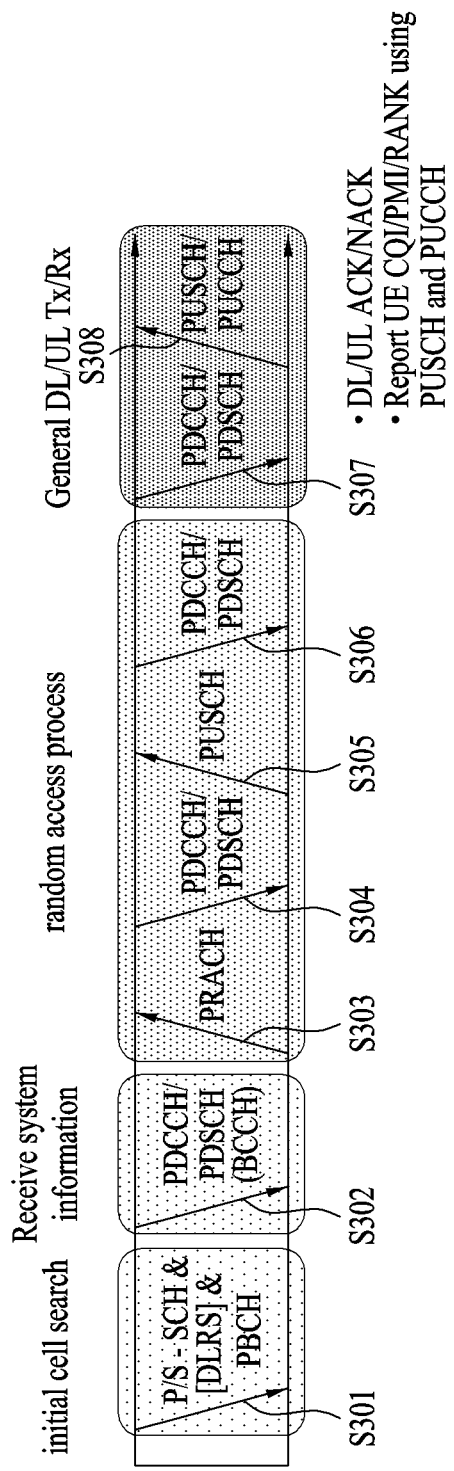
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). To this end, the UE may receive a Primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. To this end, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) through the PDCCH. Here, the DCI contains control information such as resource allocation information about a UE and has different formats according to according to different usages of DCI.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
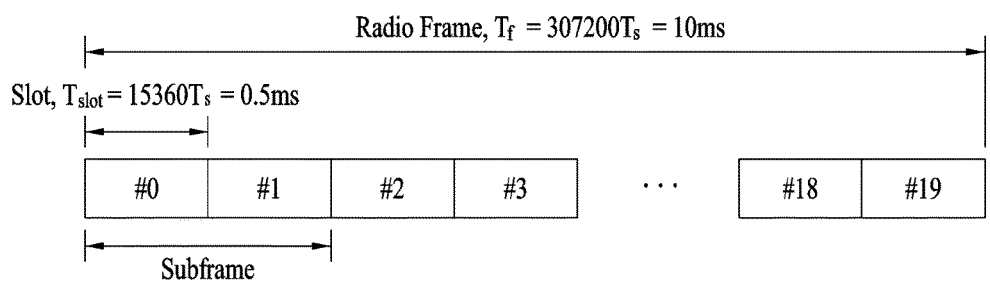
FIG. 4 is a diagram illustrating an example of the structure of a radio frame used in a long term evolution (LTE) system.

FIG. 4 is a diagram illustrating an example of the structure of a radio frame used in an LTE system.

Referring to FIG. 4, a radio frame has a length of 10 ms (327200×Ts) and includes ten subframes having an equal size. Each subframe has a length of 1 ms and includes two slots each having a length of 0.5 ms (15360×Ts). Here, Ts denotes a sampling time, which is represented as Tx=1/(15 kHz×2048)=3.2552×10$^{-8}$ (approximately 33 ns). A slot includes a plurality of orthogonal frequency division multiplexing (OFDM) symbols in the time domain and a plurality of resource blocks in the frequency domain. In the LTE system, one resource block includes 12 subcarriers×7(6) OFDM symbols. A unit time for transmitting data, transmission time interval (TTI), may be set to one or more subframes. The above-described radio frame structure is exemplary and the number of subframes included in the radio frame, the number of slots included in one subframe, and the number of OFDM symbols or SC-FDMA symbols included in each slot may be changed in various manners.

Figure 5:
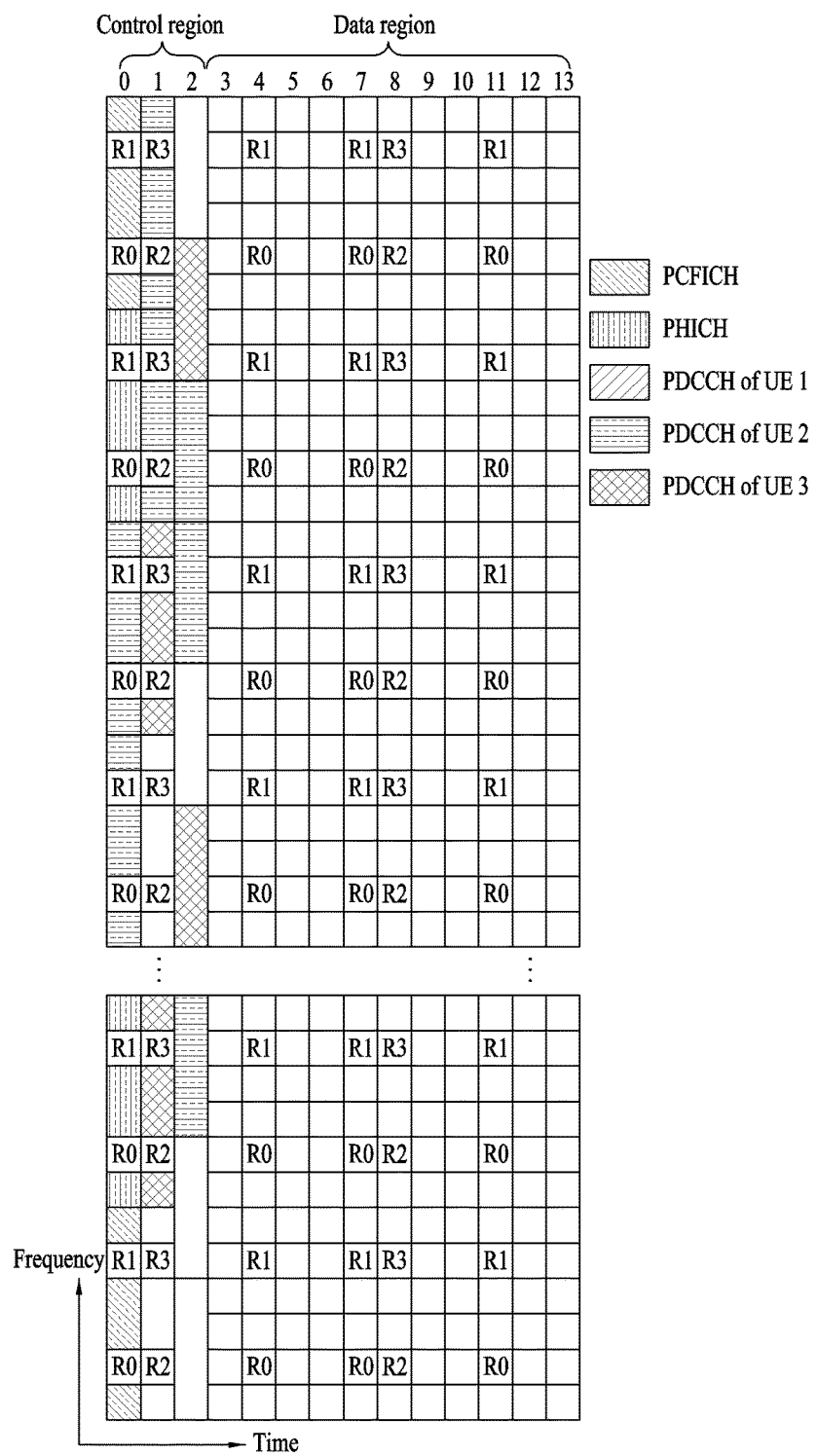
FIG. 5 is a diagram illustrating a control channel included in a control region of a subframe in a downlink radio frame.

FIG. 5 is a diagram illustrating a control channel included in a control region of a subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe settings. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a physical control format indicator channel (PCFICH), physical hybrid-arq indicator channel (PHICH), physical downlink control channel (PDCCH), etc.

The physical control format indicator channel (PCFICH) informs the UE of the number of OFDM symbols used for the PDCCH per subframe. The PCFICH is located at a first OFDM symbol and is set prior to the PHICH and the PDCCH. The PCFICH includes four resource element groups (REGs) and the REGs are dispersed in the control region based on a cell identity (ID). One REG includes four resource elements (REs). An RE indicates a minimum physical resource defined as one subcarrier x one OFDM symbol. The PCFICH has a value of 1 to 3 or 2 to 4 and is modulated using a quadrature phase shift keying (QPSK) scheme.

The physical Hybrid-ARQ indicator channel (PHICH) is used to transmit HARQ ACK/NACK for uplink transmission. That is, the PHICH refers to a channel in which DL ACK/NACK information for UL HARQ is transmitted. The PHICH includes one REG and is scrambled on a cell-specific basis. ACK/NACK is indicated by one bit and is modulated using binary phase shift keying (BPSK). The modulated ACK/NACK is spread with a spreading factor (SF) of 2 or 4. A plurality of PHICHs mapped to the same resource constitutes a PHICH group. The number of multiplexed PHICHs in the PHICH group is determined according to the number of SFs. The PHICH (group) is repeated through times in order to acquire diversity gain in the frequency domain and/or time domain.

The physical downlink control channel (PDCCH) is allocated to the first n OFDM symbols of a subframe. Here, n is an integer of 1 or more and is indicated by a PCFICH. The PDCCH includes one or more control channel elements (CCEs). The PDCCH informs each UE or a UE group of information associated with resource allocation of a paging channel (PCH) and a downlink-shared channel (DL-SCH), both of which are transport channels, uplink scheduling grant, HARQ information, etc. The paging channel (PCH) and the downlink-shared channel (DL-SCH) are transmitted through a PDSCH.

Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
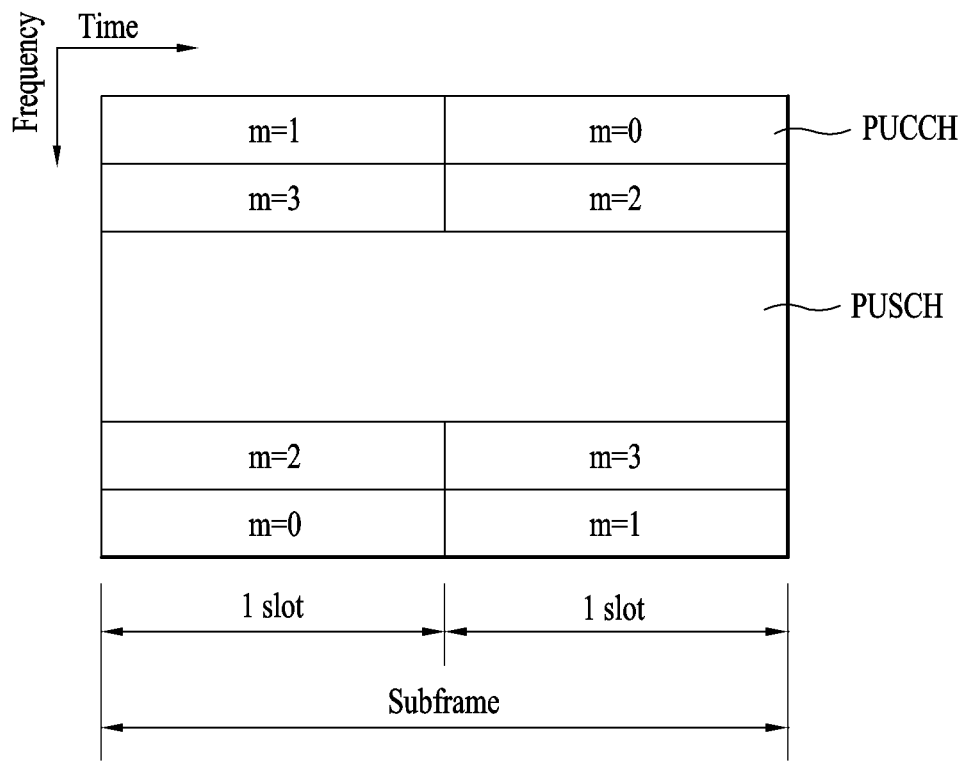
FIG. 6 is a diagram illustrating an uplink subframe structure used in an LTE system.

FIG. 6 is a diagram illustrating an uplink subframe structure used in an LTE system.

Referring to FIG. 6, a UL subframe may be divided into a region to which physical uplink control channel (PUCCH) for carrying control information is allocated and a region to which physical uplink shared channel (PUSCH) for carrying user data is allocated. The middle of the subframe is allocated to the PUSCH, while both sides of the data region in the frequency domain are allocated to the PUCCH. Control information transmitted on the PUCCH may include a Hybrid Automatic Repeat request acknowledgement/negative acknowledgement (HARQ ARCK/NACK), a Channel Quality Indicator (CQI) representing a downlink channel state, a rank indicator (RI) for multiple input multiple output (MIMO), a scheduling request (SR) requesting uplink resource allocation. A PUCCH for one UE uses one resource block that occupies different frequencies in slots in a subframe. That is, two resource blocks allocated to the PUCCH is frequency hopped at a slot boundary. In particular, PUCCHs with m=0, m=1, and m=2 are allocated to a subframe in FIG. 6.

Multiple Input Multiple Output (MIMO) System

Now a description will be given of a Multiple Input Multiple Output (MIMO) system. MIMO can increase the transmission and reception efficiency of data by using a plurality of transmission (Tx) antennas and a plurality of reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
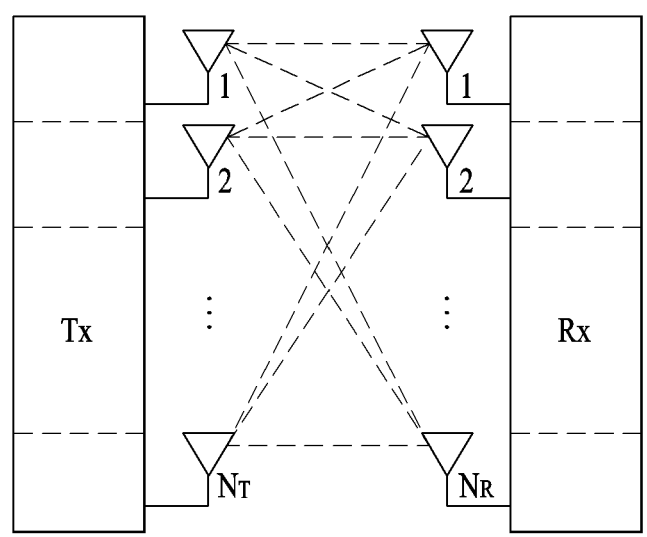
FIG. 7 illustrates the configuration of a typical multiple input multiple output (MIMO) communication system.

FIG. 7 illustrates the configuration of a typical MIMO communication system. Referring to FIG. 7, a transmitter has $N_T$ Tx antennas and a receiver has $N_R$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the vector shown in Equation 2 below.

$$s=[s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams is transmitted through a plurality of antennas, this may be spatial multiplexing. Needless to say, a hybrid scheme of spatial diversity and spatial multiplexing in combination may be contemplated.

Channel State Information (CSI) Feedback

Channel State Information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO Tx antennas. To acquire CSI from the UE, the eNB may transmit a reference signal (RS) to the UE and may command the UE to feed back measured CSI on a PUCCH or PUSCH.

CSI is classified largely into three information types, RI, PMI, and CQI. An RI is information about a channel rank, as described before. The channel rank is the number of streams that a UE can receive in the same time-frequency resources. Because the RI is determined mainly according to the long-term fading of a channel, the RI may be fed back to an eNB in a longer period than a PMI and a CQI.

A PMI is the index of a UE-preferred eNB precoding matrix determined based on a metric such as signal to interference and noise ratio (SINR), reflecting the spatial characteristics of channels. A CQI represents a channel strength. In general, the CQI reflects a reception SINR that the eNB can achieve with a PMI.

An advanced system such as an LTE-A system considers achievement of an additional multi-user diversity by the use of Multi-User MIMO (MU-MIMO). Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in Single User MIMO (SU-MIMO) should be reported in MU-MIMO.

In this context, the LTE-A standard designs a final PMI separately as a long-term and/or wideband PMI, W1 and a short-term and/or subband PMI, W2.

For example, the long-term covariance matrix of channels expressed as Equation 8 below may be used for hierarchical codebook transformation that configures one final PMI with W1 and W2.

$$W = \mathrm{norm}(W1\,W2) \quad \text{[Equation 8]}$$

In Equation 8 above, W2 is a short-term PMI, which is a codeword of a codebook reflecting short-term channel information, W is a codeword of a final codebook, and norm(A) is a matrix obtained by normalizing the norm of each column of matrix A to 1.

Conventionally, the codewords W1 and W2 are given as Equation 9 below.

$$W1(i) = \begin{bmatrix} X_i & 0 \\ 0 & X_i \end{bmatrix}, \quad \text{[Equation 9]}$$

where $X_i$ is Nt/2 by M matrix.

$$W2(j) = \begin{bmatrix} e_M^k & e_M^l & & e_M^m \\ & & \cdots & \\ \alpha_j e_M^k & \beta_j e_M^l & & \gamma_j e_M^m \end{bmatrix} \overset{r\ columns}{}$$

(if rank=r), where $1 \leq k,l,m \leq M$ and k,l,m are integer.

Here, Nt is the number of Tx antennas and M is the number of columns of a matrix Xi, which means that the matrix Xi has total M candidate column vectors. $e_M^k$, $e_M^l$, and $e_M^m$ are column vectors that have elements of 0 except for only $k_{th}$, $l_{th}$, and $m_{th}$ elements that are 1 among M elements and are $k_{th}$, $l_{th}$, and $m_{th}$ column vectors of Xi. $\alpha_j$, $\beta_j$, and $\gamma_j$ are complex values and indicate that phase rotation is applied to the $k_{th}$, $k_{th}$, and $m_{th}$ column vectors of the matrix in order to choose these column vectors, respectively. i is an integer equal to or greater than 0 and is a PMI index indicating W1. j is an integer equal to or greater than 0 and is a PMI index indicating W2.

In Equation 9 above, the codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed in the above manner may be given as Equation 10 below.

$$W1(i)*W2(j) = \begin{bmatrix} X_i(k) \\ \alpha_j X_j(k) \end{bmatrix} \quad \text{[Equation 10]}$$

In [Equation 10], a codeword is expressed as an $N_T \times 1$ vector where $N_T$ is the number of Tx antennas and the codeword is composed of an upper vector $X_i(k)$ and a lower vector $\alpha_j X_j(k)$, representing the correlation characteristics of the horizontal and vertical antenna groups, respectively. Preferably, $X_i(k)$ is expressed as a vector having the linear phase increment property, reflecting the correlation characteristics between antennas in each antenna group. For example, a Discrete Fourier Transform (DFT) matrix may be used for $X_i(k)$.

As described above, CSI in an LTE system includes, but is not limited to, CQI, PMI, and RI. Some or all of CQI, PMI, and RI may be transmitted according to a transmission mode of a UE. A case in which CSI is periodically transmitted is referred to as periodic reporting and a case in which CSI is transmitted according to request of a BS is referred to as aperiodic reporting. In case of aperiodic reporting, a request bit contained in UL scheduling information from the BS is transmitted to the UE. Then, the UE transmits CSI obtained in consideration of a transmission mode of the UE to the BS via a UL data channel (PUSCH). In case of periodic reporting, periods, offset for a corresponding period, etc. are signaled in units of subframes via an upper layer signal for each respective UE in a semi-static manner. Each UE transmits CSI obtained in consideration of a transmission mode of the UE to the BS via a UL control channel (PUCCH) according to a predetermined period. When UL data and CSI are simultaneously present in a subframe for transmitting CSI, the CSI is transmitted through a UL data channel (PUSCH) together with the data. The BS transmits transmission timing information appropriate for each respective UE to the UE in consideration of a channel state of each UE, a distribution state of UEs in a cell, etc. The transmission timing information includes a period, offset, etc. for transmission of CSI and may be transmitted to each UE through an RRC message.

FIGS. 8 to 11 illustrate periodic reporting of CSI in LTE.

Figures 8, 9:
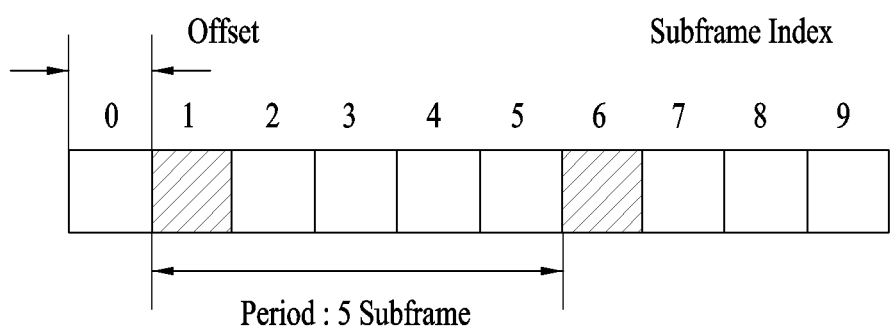
FIGS. 8 to 11 illustrate periodic reporting of channel state information (CSI)

Referring to FIG. 8, an LTE system has four CQI reporting modes. In detail, the CQI reporting mode is classified into WB CQI and SB CQI according to a CQI feedback type and is classified into no PMI and single PMI according to whether PMI is transmitted. Each UE receives information formed by combining a period and offset via RRC signaling in order to periodically report CQI.

FIG. 9 illustrates an example in which a UE transmits CSI when information indicating {period '5' and offset '1'} is signaled to the UE. Referring to FIG. 9, upon receiving the information indicating {period '5' and offset '1'}, the UE transmits CSI in units of 5 subframes with an offset of one subframe in a direction in which a subframe index increases from a $0_{th}$ subframe. CSI. CSI is basically transmitted via a PUCCH. However, when PUSCH for transmission is present at the same time, CSI is transmitted together with data via PUSCH. A subframe index is formed by combining a system frame number (or a radio frame index) (nf) and a slot index (ns, 0 to 19). Since a subframe includes 2 slots, a subframe index may be defined according to 10*nf+floor (ns/2). floor( ) indicates a rounddown function.

There are a type for transmitting only WB CQI and a type for both WB CQI and SB CQI. In case of the type for transmitting only WB CQI, CQI information about an entire band in a subframe corresponding to every CQI transmission period is transmitted. As illustrated in FIG. 8, when PMI needs to be also transmitted according to a PMI feedback type, PMI information is transmitted together with CQI information. In case of the type for transmitting both WB CQI and SB CQI, WB CQI and SB CQI are alternately transmitted.

Figure 10:
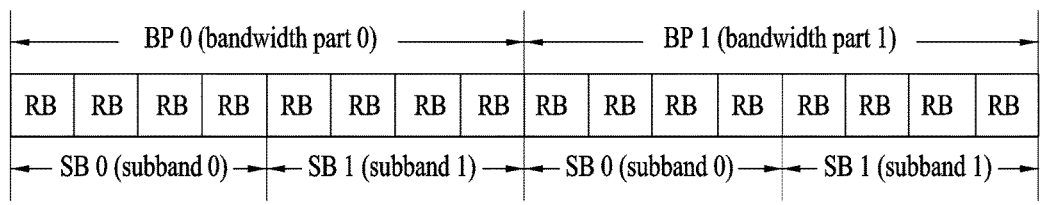
Figure 11:
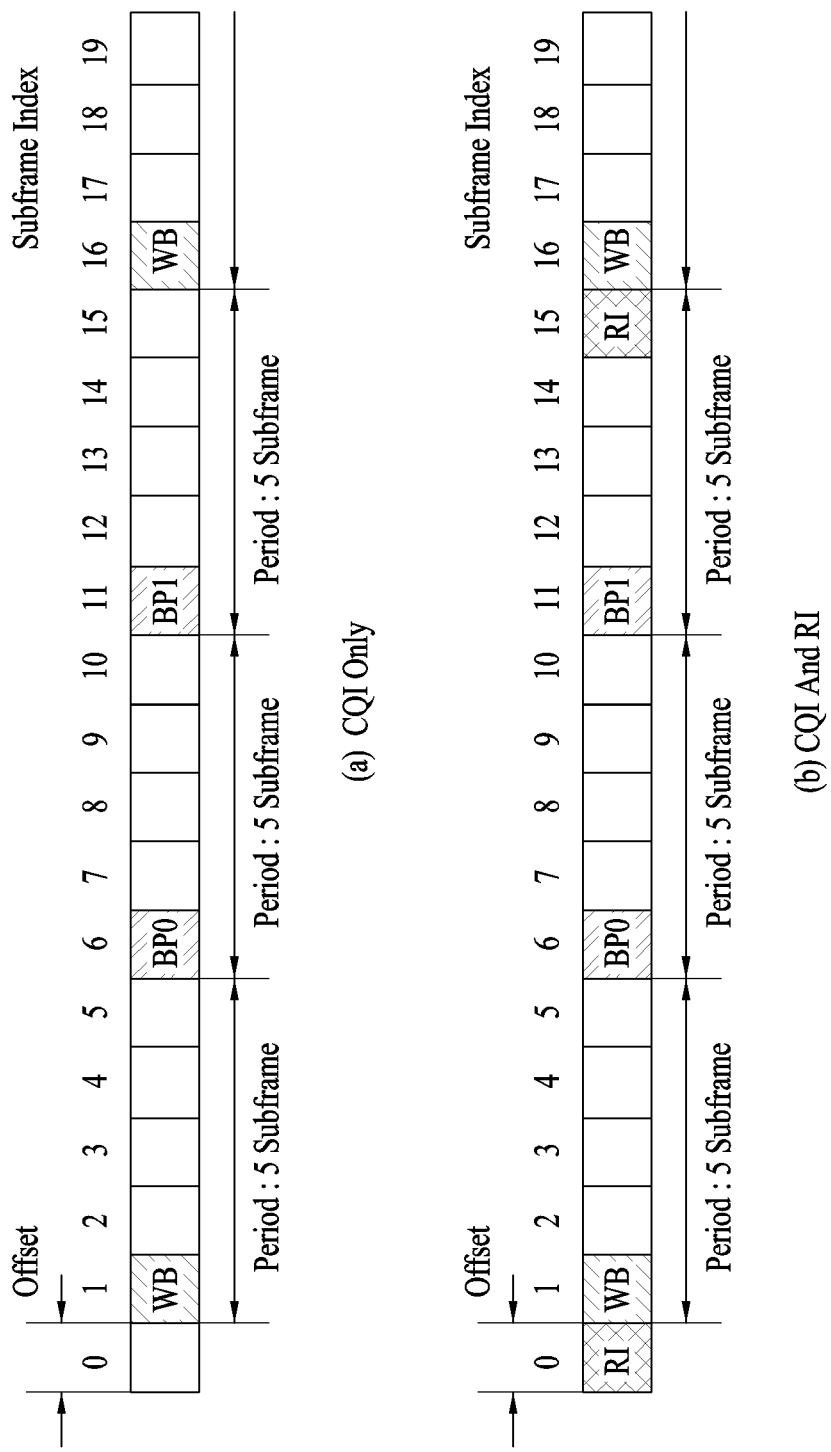

FIG. 10 is a diagram illustrating an exemplary system having a system band with 16 RBs. In this case, it is assumed that the system band includes two bandwidth parts (BPs) BP0 and BP1 which each include two subbands SB0 and SB1 which each include four RBs. This assumption is purely exemplary for explanation. The number BPs and the size of each SB may vary according to the size of the system band. In addition, the number of SBs included in each BP may vary according to the number of RBs, the number of BPs, and the size of SB.

In case of the type for transmission both WB CQI and SB CQI, WB CQI is transmitted in a first CQI transmission subframe, and CQI about an SB having a better channel state from SB0 and SB1, belonging to BP0, and an index (e.g., a subband selection indicator (SSI) corresponding to the corresponding SB are transmitted in a next CQI transmission subframe. Then, CQI about an SB having a better channel state from SB0 and SB1, belonging to BP1, and an index corresponding to the corresponding SB is transmitted in a next transmission subframe. Likewise, after WB CQI is transmitted, CQI information about BPs is sequentially transmitted. CQI information about each BP between two WB CQIs may be sequentially transmitted once to four times. For example, when CQI information about each BP between two WB CQIs is sequentially transmitted once, CQI information may be transmitted in an order of WB CQI ⇒ BP0 CQI ⇒ BP1 CQI ⇒ WB CQI. In addition, when CQI information about each BP between two WB CQIs is sequentially transmitted four times, CQI information may be transmitted in an order of WB CQI ⇒ BP0 CQI ⇒ BP1 CQI ⇒ BP0 CQI ⇒ BP1 CQI ⇒ BP0 CQI ⇒ BP1 CQI ⇒ BP0 CQI ⇒ BP1 CQI ⇒ WB CQI. Information about a number of times that each BP CQI is sequentially transmitted is signaled in an upper layer (e.g., an RRC layer).

FIG. 11(a) is a diagram illustrating an example in which a UE transmits both WB CQI and SB CQI when information indicating {period '5' and offset '1'} is signaled to the UE. Referring to FIG. 11(a), CQI may be transmitted in only a subframe corresponding to signaled period and offset irrespective a type of CQI. FIG. 11(b) illustrates a case in which RI is additionally transmitted in a case of FIG. 11(a). RI may be signaled from an upper layer (e.g., an RRC layer) via a combination of a multiple of WB CQI transmission period and offset in the corresponding transmission period. Offset of RI is signaled as a relative value based on offset of CQI. For example, when the offset of CQI is '1' and the offset of RI is '0', RI may have the same offset as CQI. The offset of RI is defined as 0 and a negative value. In detail, FIG. 11(b) assumes a case in which a RI transmission period is one time of a WB CQI transmission period and the offset of RI is '−1' in the same environment as in FIG. 11(a). Since the RI transmission period is one time of the WB CQI transmission period, transmission periods of CSI are actually the same. Since the offset of RI is '−1', RI is transmitted based on '−1' (that is, subframe #0) with respect to offset '1' of CQI in FIG. 11(a). When the offset of RI is '0', transmission subframes of WB CQI and RI overlap each other. In this case, WB CQI is dropped and RI is transmitted.

Figure 12:
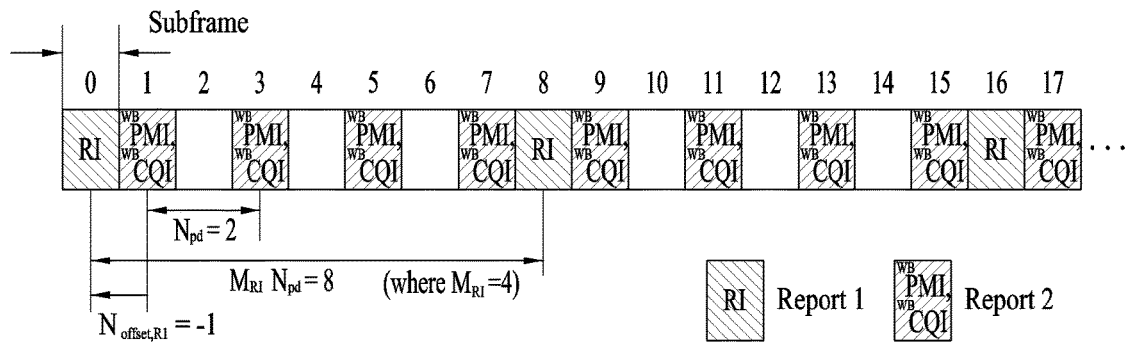
FIGS. 12 and 13 illustrate an exemplary process for periodically reporting CSI when a non-hierarchical codebook is used.

FIG. 12 is a diagram illustrating CSI feedback in case of Mode 1-1 of FIG. 8.

Referring to FIG. 12, the CSI feedback is composed of transmission of two types of report contents, Report 1 and Report 2. In detail, RI is transmitted in Report 1 and WB PMI and WB CQI are transmitted in Report 2. Report 2 is transmitted in a subframe with a subframe index satisfying (10*nf+floor(ns/2)−N offset, CQI)mod(Npd)=0. N offset, CQI corresponds to an offset value for transmission of PMI/CQI illustrated in FIG. 9. FIG. 12 illustrates a case of N offset, CQI=1. Npd 5 is a subframe interval between adjacent Reports 2. FIG. 12 illustrates a case of Npd=2. Report 1 is transmitted in a subframe with a subframe index satisfying (10*nf+floor(ns/2)−N offset, CQI−N offset, RI)mod(MRI*Npd)=0. $M_{RI}$ is determined via upper layer signaling. In addition, N offset, RI corresponds to a relative offset value for transmission of RI illustrated in FIG. 11. FIG. 12 illustrates a case of $M_{RI}$=4 and N offset, RI=−1.

Figure 13:
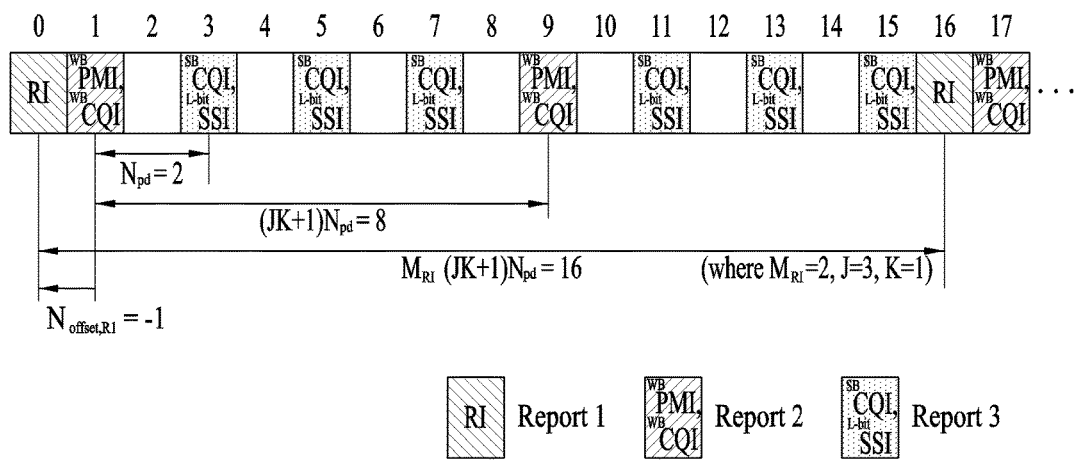

FIG. 13 is a diagram illustrating CSI feedback in case of Mode 2-1 illustrated in FIG. 8.

Referring to FIG. 13, the CSI feedback is composed of transmission of three types of report contents, Report 1, Report 2, and Report 3. In detail, RI is transmitted in Report 1, WB PMI and WB CQI are transmitted in Report 2, and subband (SB) CQI and L-bit subband selection indicator (SSI) are transmitted in Report 3. Report 2 or Report 3 is transmitted in a subframe with a subframe index satisfying (10*nf+floor(ns/2)−N offset, CQI)mod(Npd)=0. In particular, Report 2 is transmitted in a subframe with a subframe index satisfying (10*nf+floor(ns/2)−N offset, CQI)mod (H*Npd)=0. Thus, Report 2 is transmitted every interval of H*Npd and subframes between adjacent Reports 2 are filled by transmitting Report 3. In this case, H satisfies H=J*K+1, where J is the number of bandwidth parts (BPs). K indicates the number of continuously-performed full cycles for selecting a subband for each of different BPs once and transmitting subbands over all BPs and is determined via upper layer signaling. FIG. 13 illustrates a case of Npd=2, J=3, and K=1. Report is transmitted in a subframe with a subframe index satisfying (10*nf+floor(ns/2)−N offset, CQI−N offset, RI)mod(MRI*(J*K+1)*Npd)=0. FIG. 13 illustrates a case of $M_{RI}$=2 and N offset, RI=−1.

FIG. 14 is a diagram illustrating periodic reporting of CSI that has been discussed in an LTE-A system. When BS has 8 Tx antennas, in case of Mode 2-1, a precoder type indication (PTI) parameter as a 1-bit indicator is set, and a periodic reporting mode subdivided into two types according to a PTI value is considered, as illustrated in FIG. 15. In FIGS. 14, W1 and W2 indicate hierarchical codebook described with reference to Equations 8 and 9 above. When both W1 and W2 are determined, precoding matrix W completed by combining W1 and W2 is determined.

Referring to FIG. 14, In case of periodic reporting, different contents corresponding to Report 1, Report 2, and Report 3 are reported according to different reiteration periods. RI and 1-bit PTI are reported in Report 1. WB(WideBand) W1 (when PTI=0) or WB W2 and WB CQI (when PTI=1) are reported in Report 2. WB W2 and WB CQI (when PTI=0) or subband (SB) W2 and SB CQI (when PTI=1) are reported in Report 3.

Report 2 and Report 3 are transmitted in a subframe (for convenience, referred to as a first subframe set) with a subframe index satisfying (10*nf+floor(ns/2)−N offset, CQI) mod (NC)=0. N offset, CQI corresponds to an offset value for transmission of PMI/CQI illustrated in FIG. 9. In addition, Nc indicates a subframe interval between adjacent Reports 2 or Reports 3. FIG. 14 illustrates an example in which N offset, CQI=1 and Nc=2. The first subframe set is composed of subframes with an odd index. nf indicates a system frame number (or a radio frame index) and ns indicates a slot index in a radio frame. floor( ) indicates a rounddown function, and A mod B indicates a remainder obtained by dividing A by B.

Report 2 is located in some subframes in the first subframe set and Report 3 is located in the remaining subframes. In detail, Report 2 is located in a subframe with a subframe index satisfying (10*nf+floor(ns/2)−N offset, CQI) mod (H*Nc)=0. Accordingly, Report 2 is transmitted every interval of H*Nc, and one or more first subframes between adjacent Reports 2 are filled by transmitting Report 3. In case of PTI=0, H=M and M is determined via upper layer signaling. FIG. 14 illustrates a case of M=2. In case of PTI=1, H=J*K+1, K is determined via upper layer signaling, and J is the number of BPs. FIG. 14 illustrates a case of J=3 and K=1.

Report 1 is transmitted in a subframe with a subframe index satisfying (10*nf+floor(ns/2)−N offset, CQI−N offset, RI) mod (MRI*(J*K+1)*Nc)=0, and MRI is determined via upper layer signaling. N offset, RI corresponds to a relative offset value for RI. FIG. 14 illustrates a case of MRI=2 and N offset, RI=−1. According to N offset, RI=−1, transmission time for Report 1 and transmission time for Report 2 do not overlap each other. When a UE calculates RI, W1, and W2, RI, W1, and W2 are associated with each other. For example, W1 and W2 are calculated with dependence upon RI, and W2 is calculated with dependence upon W1. At a point of time when both Report 2 and Report 3 are reported after Report 1 is reported, a BS may know final W from W1 and W2.

UE Capability Information Element

LTE system (e.g., LTE-release 10 system) can representatively use a CA (carrier aggregation) technology or a higher layer MIMO technology for performance enhancement. UEs supporting the LTE system can support CA and MIMO SDMA (spatial division multiple access) and the UEs can be classified into a UE of high level capability and a UE of low level capability according to a level of supporting. In order to transmit information on capability of a UE to a base station, it may be able to use a UE capability information element consisting of various fields including a UE category.

For instance, a supported MIMO-capability field can be included in the UE capability information element. The supported MIMO-capability field includes information on the number of layers supported for spatial multiplexing in downlink. The information on the number of layers enables MIMO-capabilities different from each other to be configured according to a bandwidth, a band, or a band combination.

And, a UE category field can be included in the UE capability information element. The UE category field can define uplink and downlink capability for each of a category 1 UE to a category 8 UE. Specifically, the UE category field can respectively include an uplink physical layer parameter value and a downlink physical layer parameter value for a UE of each category. And, although CA (carrier aggregation) is not supported, a category 6 UE to a category 8 UE can include a radio parameter (rf-parameters) field.

Method of Determining RI Bit Length (Bit Width)

A UE determines an RI bit length corresponding to each serving cell by a minimum value among maximum values of supported layers defined by the number of RS port numbers of each serving cell and a UE category.

In this case, it may be able to configure MIMO capabilities different from each other according to a bandwidth, a band and a band combination. For instance, a UE can perform a CA operation with a different serving cell 2 of a bandwidth class A, which is non-contiguously positioned on a band 2 corresponding to a band identical to a band of a serving cell 1 of the bandwidth class A on the band 2.

When a UE performs CA for carriers of a plurality of non-contiguous bandwidths on an identical band, if a rank mapped to each of the carriers is not determined, a problem occurs in case of performing a method of mapping a maximum rank to a serving cell.

FIG. 15 is a diagram for a band combination (2A, 2A) of non-contiguous intra-bands on band 2. In this case, if each of the two bands has MIMO capability of which a maximum rank corresponds to 2 and 4, respectively, the aforementioned rank mapping problem occurs. Hence, when a UE and a base station encode or decode CSI feedback information, a problem occurs. This is because, since the UE encodes an RI after an RI bit length (width) is determined on the basis of a maximum layer and the number of configured RS ports defined in MIMO capability information of the UE for RI feedback, it is uncertain which MIMO capability is to be applied to a band corresponding to current feedback information. Similar to the UE, since an eNB decodes RI information after an RI bit length (width) is determined using an identical scheme, the eNB is uncertain that which MIMO capability is to be applied to a band corresponding to current feedback information. Due to the uncertainty, the UE and the eNB may perform RI encoding or RI decoding by applying RI bit lengths (width) different from each other. In this case, the eNB is unable to receive an RI value.

In FIG. 15, an example for a case that two class As exist on a band 2 is explained. Yet, an embodiment described in the following can also be applied to a case that the random numbers of random classes exist on a random band.

In the following, a mapping method of a UE is explained in case that mapping is ambiguous between a serving cell and a maximum rank for a band combination of non-contiguous intra-bands. A UE and a base station determine maximum number of supported layers for each band combination according to embodiments described in the following and determine an RI bit length (width) using the maximum number of supported layers. For clarity, the maximum number of supported layers supported to each band combination is called a maximum layer value.

Embodiment 1-1

First of all, according to embodiment 1-1, assume that a UE and an eNB map a lower maximum layer value to a serving cell positioned at a relatively lower frequency and map a higher maximum layer value to a serving cell positioned at a relatively higher frequency. In particular, assume that a lower maximum value is mapped to a serving cell of a lower center frequency and a higher maximum value is mapped to a serving cell of a higher center frequency.

If three or more serving cells are capable of performing CA on an identical band and an identical band class, a lower maximum layer value is sequentially configured to a serving cell from a serving cell positioned on a lower frequency first. For instance, if three class As exist on a band 2, maximum number of supported layers is configured to the class As as 2, 2 and 4 in supportedBandCombination, and serving cells are named as a serving cell 0, a serving cell 1 and a serving cell 2 in an order of occupying a lower frequency band, the maximum number of supported layers of the serving cell 0, the serving cell 1 and the serving cell 2 correspond to 2, 2 and 4, respectively.

Embodiment 1-2

A mapping order of embodiment 1-2 is designated in a manner of being opposite to a mapping order of the embodiment 1-1. In particular, a UE and an eNB assume that the higher maximum number of supported layers is mapped to a serving cell positioned at a relatively lower frequency and the lower maximum number of supported layers is mapped to a serving cell positioned at a relatively higher frequency.

In particular, the UE and the eNB assume that the lower maximum number of supported layers is mapped to a serving cell of a higher center frequency and the higher maximum number of supported layers is mapped to a serving cell of a lower center frequency.

If three or more serving cells are capable of performing CA on an identical band and an identical band class, a higher maximum layer value is sequentially configured to a serving cell from a serving cell positioned on a lower frequency first. For instance, if three class As exist on a band 2, maximum number of supported layers is configured to the class As as 2, 2 and 4 in supportedMIMO-CapabilityDL, and serving cells are named as a serving cell 0, a serving cell 1 and a serving cell 2 in an order of occupying a lower frequency band, the maximum number of supported layers of the serving cell 0, the serving cell 1 and the serving cell 2 correspond to 4, 2 and 2, respectively.

Embodiment 2-1

Embodiment 2-1 corresponds to a method of using a cell index. According to the embodiment 2-1, a UE and an eNB assume that the lower maximum number of supported layers is mapped to a serving cell of a lower serving cell index and the higher maximum number of supported layers is mapped to a serving cell of a higher serving cell index.

If three or more serving cells are capable of performing CA on an identical band and an identical band class, a lower maximum layer value is sequentially configured to a serving cell from a serving cell of a lower serving cell index first. For instance, if three class As exist on a band 2 and maximum number of supported layers is configured to the class As as 2, 2 and 4 in supported capability MIMO field, the maximum number of supported layers of the serving cell 0, the serving cell 1 and the serving cell 2 correspond to 2, 2 and 4, respectively.

Embodiment 2-2

A mapping order of embodiment 2-2 is designated in a manner of being opposite to a mapping order of the embodiment 2-1. According to the embodiment 2-2, a UE and an eNB assume that the lower maximum number of supported layers is mapped to a serving cell of a higher serving cell index and the higher maximum number of supported layers is mapped to a serving cell of a lower serving cell index.

If three or more serving cells are capable of performing CA on an identical band and an identical band class, a higher maximum layer value is sequentially configured to a serving cell from a serving cell of a lower serving cell index first. For instance, if three class As exist on a band 2 and maximum number of supported layers is configured to the class As as 2, 2 and 4 in supported capability MIMO field, the maximum number of supported layers of the serving cell 0, the serving cell 1 and the serving cell 2 correspond to 4, 2 and 2, respectively.

Embodiment 3

According to embodiment 3, an eNB receives UE capability information from a UE, maps maximum number of supported layers according to a serving cell with reference to the UE capability information and informs the UE of a result of the mapping via upper layer signaling (e.g., RRC signaling). The UE determines an RI bit length corresponding to each serving cell using the received mapping information. The UE determines an RI bit length corresponding to each serving cell using the information on the maximum number of supported layers according to each serving cell capable of being known from the mapping information and a minimum value of an RS configured according to a serving cell.

For instance, if a category 6 UE is capable of performing CA using two class A bandwidths on a band 2 and the maximum number of supported layers is set to each of the bandwidths as 2 and 4, respectively, in supported capability MIMO field, the eNB determines the maximum number of supported layers for a serving cell 0 and a serving cell 1 as 2 and 4, respectively, and informs the UE of the determination. As a result, the UE can correctly determine the maximum number of supported layers according to a serving cell.

Embodiment 4

According to embodiment 4, an eNB and a UE ignore supported capability MIMO field information and determine an RI bit length for each serving cell using a value of maximum number of supported layers defined in a UE category.

For instance, if a category 6 UE is capable of performing CA using three class A bandwidths on a bands 2, the UE and the eNB ignore layer information of the supported capability MIMO field and determine the maximum number of supported layers of each serving cell using the maximum number of supported layers defined in the UE category and a minimum value of the number of RS ports of each serving cell. When the number of RS ports of a serving cell 0, a serving cell 1 and a serving cell 2 correspond to 2, 2 and 4, respectively, since the maximum number of supported layers supported by the category 6 UE corresponds to 4, the UE and the eNB assume that the maximum number of supported layers of the serving cell 0, the serving cell 1 and the serving cell 2 as 2, 2 and 4, respectively.

Embodiment 5-1

According to embodiment 5-1, a UE and an eNB assume that the lower maximum number of supported layers is mapped to a serving cell of a smaller bandwidth and the higher maximum number of supported layers is mapped to a serving cell of a bigger bandwidth.

If three or more serving cells are capable of performing CA on an identical band and an identical band class, a lower maximum layer value is sequentially configured to a serving cell from a serving cell of a smaller bandwidth first. For instance, if three class As exist on a band 2, the maximum number of supported layers is configured to the class As as 2, 2 and 4 in supported capability MIMO field, and a bandwidth of a serving cell 0, a serving cell 1 and a serving cell 2 corresponds to 20 MHz, 10 MHz and 10 MHz, respectively, the maximum number of supported layers of the serving cell 0, the serving cell 1 and the serving cell 2 correspond to 4, 2 and 2, respectively.

In this case, like the serving cell 1 and the serving cell 2, if a partial serving cell has an identical bandwidth but maximum layer values corresponding to the two cells are different from each other, the UE and the eNB can use one of the aforementioned embodiments 1-1 to 4 when the maximum number of supported layers of the serving cell 1 and the serving cell 2 is determined.

For instance, if three class As exist on a band 2, maximum number of supported layers is configured to the class As as 2, 4 and 4 in supported MIMO field, and a bandwidth of a serving cell 0, a serving cell 1 and a serving cell 2 corresponds to 20 MHz, 10 MHz and 10 MHz, respectively, the maximum number of supported layers of the serving cell 0 corresponds to 4, which is a biggest value. The maximum number of supported layers of the serving cell 1 and the maximum number of supported layers of the serving cell 2 are determined using one of the remaining values, i.e., 2 and 4. One of the aforementioned embodiments can be used to map the maximum layer value of the serving cell 1 and the serving cell 2 of which a bandwidth is identical to each other. When the serving cell 1 exists on a frequency band lower than a frequency band of the serving cell 2, if the embodiment 1-1 is used to determine the maximum number of supported layer, the maximum number of supported layers of the serving cell 1 existing on the lower frequency band can be set to 2 and the maximum number of supported layers of the serving cell 2 existing on a higher frequency band can be set to 4.

Embodiment 5-2

A mapping order of embodiment 5-2 is designated in a manner of being opposite to a mapping order of the embodiment 5-1. A UE and an eNB assume that the lower maximum number of supported layers is mapped to a serving cell of a bigger bandwidth and the higher maximum number of supported layers is mapped to a serving cell of a smaller bandwidth.

If three or more serving cells are capable of performing CA on an identical band and an identical band class, a lower maximum layer value is sequentially configured to a serving cell from a serving cell of a bigger bandwidth first. For instance, if three class As exist on a band 2, the maximum number of supported layers is configured to the class As as 2, 4 and 4 in supported capability MIMO field, and a bandwidth of a serving cell 0, a serving cell 1 and a serving cell 2 corresponds to 20 MHz, 10 MHz and 10 MHz, respectively, the maximum number of supported layers of the serving cell 0, the serving cell 1 and the serving cell 2 correspond to 2, 4 and 2, respectively.

In this case, like the serving cell 1 and the serving cell 2, if a partial serving cell has an identical bandwidth but maximum layer values corresponding to the two cells are different from each other, the UE and the eNB can use one of the aforementioned embodiments 1-1 to 4 when the maximum number of supported layers of the serving cell 1 and the serving cell 2 is determined.

Embodiment 6-1

According to embodiment 6-1, a UE and an eNB assume that the lower maximum number of supported layers is mapped to a serving cell of which the number of CSI process assigned to each serving cell is bigger and the higher maximum number of supported layers is mapped to a serving cell of which the number of CSI process assigned to each serving cell is smaller.

If three or more serving cells are capable of performing CA on an identical band and an identical band class, a lower maximum layer value is sequentially configured to a serving cell from a serving cell of which the number of CSI process is bigger first.

For instance, if three class As exist on a band 2, the maximum number of supported layers is configured to the class As as 2, 2 and 4, respectively, in supported capability MIMO field, and the number of CSI process assigned to a serving cell 0, a serving cell 1 and a serving cell 2 corresponds to 4, 3 and 3, respectively, the maximum number of supported layers of the serving cell 0, the serving cell 1 and the serving cell 2 correspond to 2, 2 and 4, or 2, 4 and 2, respectively. In order to map the maximum number of supported layers of the serving cell 1 and the serving cell 2 of which the number of CSI process is identical to each other, it may use one of the aforementioned embodiments including the embodiment 1-1 to the embodiment 5-2. For instance, in case of using the embodiment 2-1 using a cell index, the maximum number of supported layers of the serving cell 0, the serving cell 1 and the serving cell 2 is set to 2, 2 and 4, respectively.

Embodiment 6-2

According to embodiment 6-2, a UE and an eNB assume that the lower maximum number of supported layers is mapped to a serving cell of which the number of CSI process assigned to each serving cell is smaller and the higher maximum number of supported layers is mapped to a serving cell of which the number of CSI process assigned to each serving cell is bigger. If three or more serving cells are capable of performing CA on an identical band and an identical band class, a lower maximum layer value is sequentially configured to a serving cell from a serving cell of which the number of CSI process is smaller first.

As an example, if three class As exist on a band 2, maximum number of supported layers is configured to the class As as 2, 2 and 4, respectively, in supported capability MIMO field, and the number of CSI process assigned to a serving cell 0, a serving cell 1 and a serving cell 2 corresponds to 4, 3 and 3, respectively, the maximum number of supported layers of the serving cell 0, the serving cell 1 and the serving cell 2 correspond to 4, 2 and 2, respectively.

As a different example, if three class As exist on a band 2, the maximum number of supported layers is configured to the class As as 2, 2 and 4, respectively, in supported capability MIMO field, and the number of CSI process assigned to a serving cell 0, a serving cell 1 and a serving cell 2 corresponds to 4, 4 and 3, respectively, the maximum number of supported layers of the serving cell 0, the serving cell 1 and the serving cell 2 correspond to 4, 2 and 2, or 2, 4 and 2, respectively. In this case, in order to map the maximum number of supported layers of the serving cell 1 and the serving cell 2 of which the number of CSI process is identical to each other, it may use one of the aforementioned embodiments including the embodiment 1-1 to the embodiment 5-2. For instance, in case of using the embodiment 2-1 using a cell index, the maximum number of supported layers of the serving cell 0, the serving cell 1 and the serving cell 2 is set to 2, 4 and 2, respectively.

Embodiment 7

Embodiment 7 explains a solution for a case that a UE transmits UE capability information several times to a band combination. If a UE transmits UE capability information several times to a band combination, RI bit length calculation of the UE might be ambiguous.

For instance, in FIG. 15, if a UE transmits maximum number of supported layers of a band 2A (serving cell 0) and a band 2A (serving cell 1) as 2 and 4, respectively, and additionally transmits 4 and 2, respectively, a problem occurs. According to a current LTE spec, when the UE calculates an RI bit length according to each serving cell, the RI bit length is determined by a minimum value among eNB antenna configuration (i.e., the number of CSI-RS ports) of a corresponding serving cell and supported MIMO capability field of the serving cell. Yet, in this case, the UE is unable to know information on whether an eNB uses the maximum number of supported layers (2, 4) or (4, 2) for (2A, 2A). As a result, when the RI bit length is calculated according to each serving cell, the UE is also unable to know which one is used to assume the supported MIMO capability field of the serving cell among 2 and 4.

Hence, in order to prevent the aforementioned problem, it may be able to configure the UE to upload single UE capability information only for a specific band combination. In particular, it may be able to configure the UE not to transmit a plurality of UE capability information different from each other for a specific band combination.

As a different solution, it may be able to indirectly signal a UE of whether an eNB uses maximum number of supported layers (2, 4) or (4, 2) for (2A, 2A). For instance, the number of CSI processes of a serving cell 0 and the number of CSI processes of a serving cell 1 are configured by values different from each other and the UE and the eNB promise to make a serving cell of which the number of CSI processes is smaller use the smaller maximum number of supported layers, i.e., 2 and make a serving cell of which the number of CSI processes is bigger use the bigger maximum number of supported layers, i.e., 4. When an RI bit length of each serving cell is determined, the UE determines the RI bit length based on a minimum value among antenna configuration of a corresponding serving cell and the maximum number of supported layers of the corresponding cell, which is determined using the aforementioned scheme.

On the contrary, the UE and the eNB may promise to make a serving cell of which the number of CSI processes is smaller use the bigger maximum number of supported layers, i.e., 4 and make a serving cell of which the number of CSI processes is bigger use the smaller maximum number of supported layers, i.e., 2. When an RI bit length of each serving cell is determined, the UE determines the RI bit length based on a minimum value among antenna configuration of a corresponding serving cell and the maximum number of supported layers of the corresponding cell, which is determined using the aforementioned scheme.

As a further different solution, when a UE calculates an RI bit length of each serving cell, the UE can calculate the RI bit length on the basis of a maximum value of supported capability MIMO field values available for the corresponding serving cell. In particular, in the aforementioned example, when the supported capability MIMO field corresponds to 2 or 4 in the serving cell 0, the supported capability MIMO field is determined by a maximum value corresponding to 4. The UE can determine the RI bit length on the basis of a minimum value among the maximum value and eNB antenna configuration of the serving cell 0. Since supported capability MIMO field also corresponds to 2 or 4 for the serving cell 1, the supported capability MIMO field is determined by a maximum value corresponding to 4. The UE can determine the RI bit length on the basis of a minimum value among the maximum value and eNB antenna configuration of the serving cell 1.

A method of transmitting and receiving uplink MIMO according to a preferred embodiment of the present invention is explained with reference to FIG. 16 in the following.

In the step S161, a UE receives information on the number of first reference signal (RS) antenna ports of a first cell and information on the number of second RS antenna ports of a second cell. In this case, an example of a reference signal may include a CSI-RS. Information on the number of RS antenna ports can be transmitted via higher layer signaling (e.g., RRC signaling).

In the step S163, the UE receives information on the number of first layers and information on the second layers. As mentioned in the foregoing description, information on the number of layers can be transmitted to a UE capability information element in a manner of being included in a supported MIMO capability field.

In the step S165, the UE maps the number of the first layers to one of a first cell and a second cell and maps the number of the second layers to another cell. In this case, a method of determining a cell to which the number of the first layers or the number of the second cells is mapped among the first cell and the second cell can be determined using one of the aforementioned embodiments including the embodiment 1-1 to the embodiment 7.

In the step S167, the UE determines a bit length of a first RI based on a minimum value among the number of the first layers and the number of RS antenna ports associated with the number of the first layers and determines a bit length of a second RI based on a minimum value among the number of the second layers and the number of RS antenna ports associated with the number of the second layers. In particular, the UE compares the number of RS antenna ports for a serving cell mapped to the number of layers and the number of the layers with each other and determines a bit length of an RI according to a minimum value. For instance, if a minimum value corresponds to 2, a bit length of an RI becomes 1 bit. If the minimum value corresponds to 4, the bit length of the RI becomes 2 bits.

Figure 16:
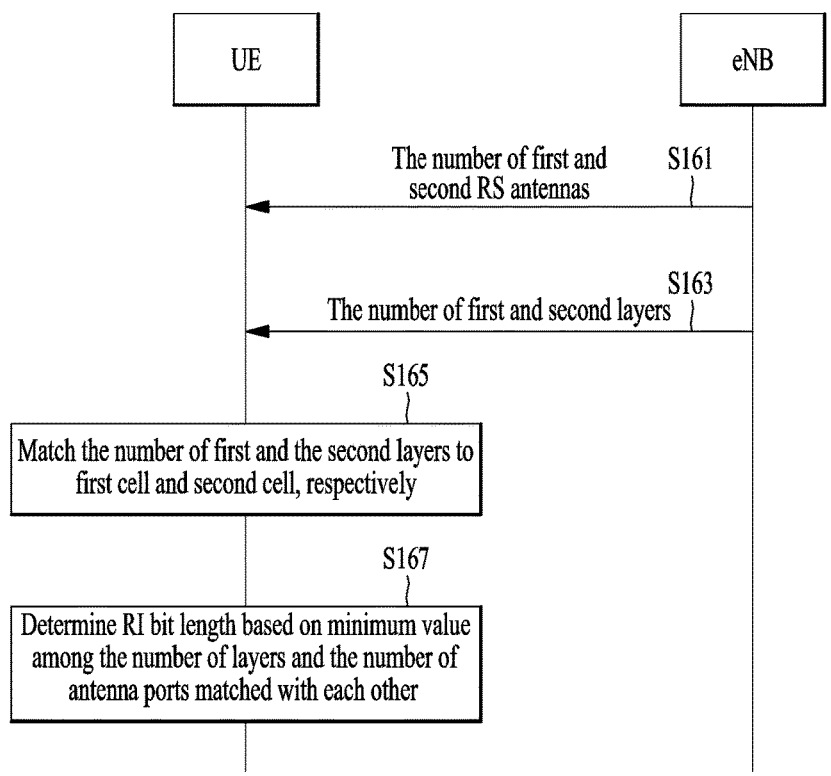
FIG. 16 is a flowchart according to the present invention.

In case of a method for determining a bit length of a rank index according to the present invention described in FIG. 16, items mentioned earlier in various embodiments of the present invention can be independently applied or two or more embodiments can be applied at the same time. For clarity, explanation on overlapped content is omitted.

Figure 17:
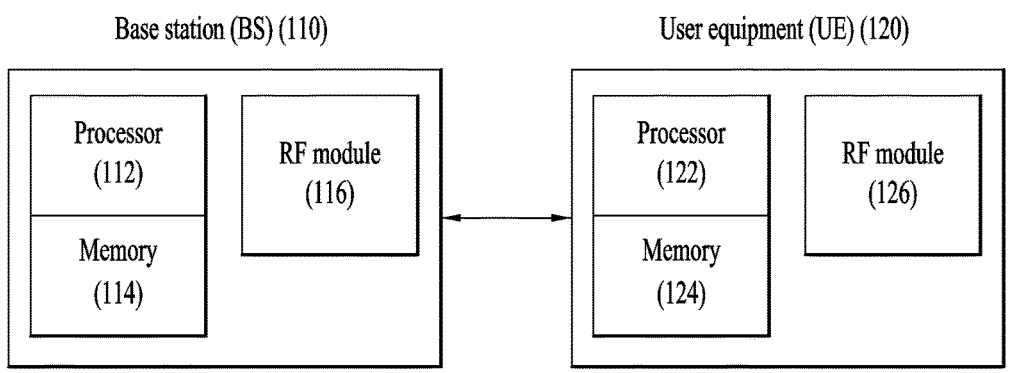
FIG. 17 is a diagram for an example of a base station and a user equipment capable of being applied to an embodiment of the present invention.

Base Station and User Equipment to which Embodiment of the Present Invention is Applicable FIG. 17 is a diagram for an example of a base station and a user equipment capable of being applied to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 17, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention can be used for such a wireless communication device as a user equipment, a relay, a base station and the like.

The invention claimed is:

1. A method of determining a bit length (bit width) of a rank index (RI), which is determined by a user equipment in a wireless communication system, the method comprising the steps of:

receiving information on a number of first reference signal (RS) antenna ports of a first cell and a number of second RS antenna ports of a second cell, wherein the first cell and the second cell have non-continuous bandwidths in a same band;

receiving information on a number of first layers and a number of second layers;

wherein the number of first layers and the number of second layers are a maximum number of layers supported by the wireless communication system for each cell, and wherein the maximum number of layers is defined by Multi Input Multi Output (MIMO) capability information of the UE, mapping the number of first layers to one of the first cell and the second cell and mapping the number of second layers to the other one of the first cell and the second cell; and determining a bit length of a first RI based on a minimum value among the number of first layers and the number of RS antenna ports associated with the number of first layers, and determining a bit length of a second RI based on a minimum value among the number of second layers and the number of RS antenna ports associated with the number of second layers.

2. The method of claim 1, wherein the mapping step comprises: mapping a lower value among the number of first layers and the number of second layers to the one cell among the first cell and the second cell that has the lower center frequency.

3. The method of claim 1, wherein the mapping step comprises: mapping a higher value among the number of first layers and the number of second layers to the one cell among the first cell and the second cell that has the lower center frequency.

4. The method of claim 1, wherein the mapping step comprises: mapping a lower value among the number of first layers and the number of second layers to the one cell among the first cell and the second cell that has a lower cell index.

5. The method of claim 1, wherein the mapping step comprises: mapping a higher value among the number of first layers and the number of second layers to the one cell among the first cell and the second cell that has a lower cell index.

6. The method of claim 1, wherein the mapping step comprises: mapping a lower value among the number of first layers and the number of second layers to the one cell among the first cell and the second cell that has a lower bandwidth.

7. The method of claim 1, wherein the mapping step comprises: mapping a higher value among the number of first layers and the number of second layers to the one cell among the first cell and the second cell that has a lower bandwidth.

8. The method of claim 1, wherein the mapping step comprises: mapping a lower value among the number of first layers and the number of second layers to the one cell among the first cell and the second cell that has a lower number of assigned CSI (channel state information) processes.

9. The method of claim 1, wherein the mapping step comprises: mapping a higher value among the number of first layers and the number of second layers to the one cell among the first cell and the second cell that has a lower number of assigned CSI (channel state information) processes.

10. The method of claim 1, further comprising the step of:
receiving information on the number of layers mapped to the first cell and the second cell, respectively, via RRC (radio resource control) signaling.

11. A user equipment (UE) determining a bit length (bit width) of a rank index (RI) in a wireless communication system, the UE comprising:
an RF (radio frequency) unit; and
a processor that:
controls the RF unit to receive information on a number of first reference signal (RS) antenna ports of a first cell and a number of second RS antenna ports of a second cell, wherein the first cell and the second cell have non-continuous bandwidths in a same band;
controls the RF unit to receive information on the number of first layers and the number of second layers,
wherein the number of first layers and the number of second layers are a maximum number of layers supported by the wireless communication system for each cell, and
wherein the maximum number of layers is defined by Multi Input Multi Output (MIMO) capability information of the UE,
maps the number of first layers to one of the first cell and the second cell and maps the number of second layers to the other one of the first cell and the second cell,
determines a bit length of a first RI based on a minimum value among the number of first layers and the number of RS antenna ports associated with the number of first layers and determines a bit length of a second RI based on a minimum value among the number of second layers and the number of RS antenna ports associated with the number of second layers.

12. The user equipment of claim 11, wherein the processor maps a lower value among the number of first layers and the number of second layers to the one cell among the first cell and the second cell that has a lower center frequency.

13. The user equipment of claim 11, wherein the processor maps a lower value among the number of first layers and the number of second layers to the one cell among the first cell and the second cell that has a lower cell index.

14. The user equipment of claim 11, wherein the processor maps a lower value among the number of first layers and the number of second layers to the one cell among the first cell and the second cell that has a lower bandwidth.

15. The user equipment of claim 11, wherein the processor maps a lower value among the number of first layers and the number of second layers to the one cell among the first cell and the second cell that has a lower number of assigned CSI (channel state information) processes.

* * * * *